Patented July 1, 1924.

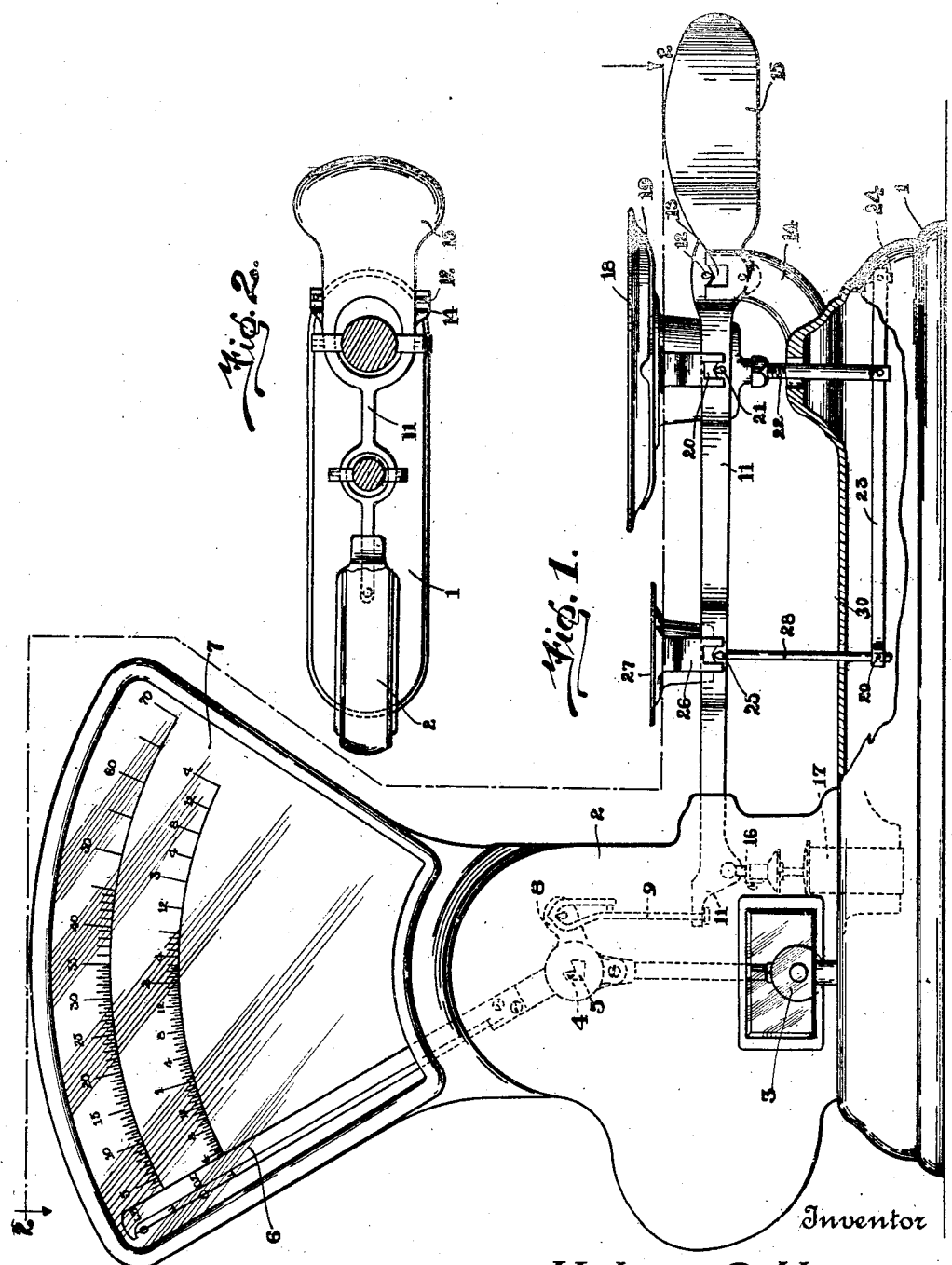

1,499,775

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed January 26, 1920. Serial No. 354,141.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales and particularly scales of the counter type, and has for one of its objects the provision of a scale having sufficient capacity to weigh comparatively large parcels while at the same time being sufficiently sensitive to accurately weigh articles relatively much lighter, thereby combining in a single scale desirable features heretofore only attainable separately.

Another object is the provision of means whereby the movement of the indicator may be kept within the limits of a chart of convenient size when comparatively heavy loads are weighed and may be given a relatively greater movement in weighing light loads.

Another object is the provision of a scale which will automatically indicate the weight of heavy articles in pounds and fractions thereof and the weight of light articles in ounces and fractions thereof.

A more specific object of the invention is to provide a scale adapted to weigh parcel post packages as well as letters, and second, third and fourth class mail matter.

With the above and other objects in view which will readily appear as the invention is better understood, my invention consists in the novel construction, combination and arrangement of parts to be hereinafter more fully described and pointed out in the subjoined claims.

Reference is to be had to the accompanying drawings illustrating a preferred embodiment of my invention and wherein similar reference numerals designate similar parts throughout the several views.

In the drawings:—

Figure 1 is an elevation, partly in section, of a fan type scale embodying my invention; and Figure 2 is a horizontal section on the line 2—2 of Figure 1.

Referring to the drawings in detail, the base 1 of the scale has secured thereto an upright housing 2 of well-known form which carries the load-offsetting and indicating mechanism of the scale. The load-offsetting mechanism in connection with which I have in this instance illustrated my invention is of the pendulum type, but it is to be understood that the invention is also well adapted for use in other types of scales, such as spring and beam scales.

A pendulum 3 is mounted on horizontally aligned knife-edge pivots 4 (only one of which is shown in the drawings) rigidly secured to the said pendulum and carried in bearings 5 suitably mounted in the housing 2. Rigidly secured to the pendulum 3 is an indicator hand 6 which moves over the graduated chart 7 as the pendulum swings, resting over the zero graduations in each row of indications when the pendulum is in the normal position shown in the drawing.

The upper end of the pendulum is provided with a power arm 8 to which is secured the upper end of a link 9, the lower end of the link being connected by means of a stirrup to the nose of a platform-supporting lever 11.

The fulcrum pivots 12 of the lever 11 are rockably mounted in bearings 13 seated in the upper ends of a base horn 14 which is rigidly supported on the base 1. The end of the lever which projects on the opposite side of the fulcrum pivots from the pendulum is enlarged to form a counterbalance 15 for the mechanism, later to be described, normally carried by the lever 11 and connected parts.

In order to prevent excessive oscillation of the weighing mechanism, the forward end of the lever is connected by means of the link 16 to a dash pot retarding device 17.

A parcel-receiving platter 18 is carried by a spider 19 having seated therein a pair of inverted V-groove bearings 20 which are carried upon the knife edges of load-carrying pivots 21.

A spider stem 22 extends downwardly from the spider and is pivotally connected at its lower end to a check link 23, the rear end of the link 23 being pivoted to the lower end of an adjustably-mounted shift post 24, the parts being so proportioned that lines joining the pivots 12 and 21 and the pivots connecting the check link to the stem 22 and post 24 form a parallelogram.

The lever 11 is also provided with a second pair of load pivots 25 between the platform 18 and the pendulum upon which are carried the inverted V-bearings of the platter spider 26. The platter 27 which lies upon the spider 26 is designed to receive small packages or letters.

No attempt has been made to show the pivots 21 and 25 at any particular relative distances from the fulcrum pivots 12, the parts in the drawings being merely shown in proportions convenient for clear illustration of the principles involved in my invention. When the scale is to be used as a mailing scale the proportions may be such that an ounce of load on the platter 27 will move the indicator to the same extent as a pound of load on the platter 18.

A spider stem 28 depends from the spider 26 and at its lower end is pivoted at 29 to the link 23, the parts being so proportioned that lines joining the pivots 12 and 25 and the pivots connecting the link 23 to the stem 28 and post 24 form a parallelogram. The link 23, being extended for connection to the spider stem 28, is very much longer than the check link commonly used, and for this reason and since it is connected to the lever 11 at two points it is less liable to lose its parallelism with the lever 11 than the commonly used short check link. This results in maintaining the accuracy of the scale in weighing loads on the marginal portions of the platters.

The check link mechanism is enclosed in a housing 30 on the lower side of the base 1 and is thereby protected from dirt and such injuries as might result from coming in contact with objects and protuberances on the counter.

It will be seen that I have thus provided a scale having a platter so related to the load-offsetting mechanism that the weight of comparatively heavy articles placed thereon may be balanced without excessive movement of the weighing mechanism and the weight thus indicated upon a chart of convenient size, and having an additional platter so related to the load-offsetting mechanism that in weighing a light load placed thereon the weight is determined with great accuracy.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. In a weighing scale, in combination, a lever fulcrumed adjacent one end, load-offsetting mechanism, a connection from the other end of said lever to said load-offsetting mechanism, and a plurality of commodity-receivers connected to said lever intermediate its fulcrum and the connection to said load-offsetting mechanism.

2. In a weighing scale, in combination, a lever fulcrumed adjacent one end, load-offsetting mechanism, a connection from the other end of said lever to said load-offsetting mechanism, and a plurality of commodity-receivers carried by said lever intermediate its fulcrum and the connection to said load-offsetting mechanism.

3. In a weighing scale, in combination, a lever fulcrumed adjacent one end, load-offsetting mechanism, a connection from the other end of said lever to said load-offsetting mechanism, and a plurality of commodity-receivers arranged side by side and connected to said lever intermediate its fulcrum and the connection to said load-offsetting mechanism.

4. In a weighing scale, in combination, load-offsetting mechanism, a lever connected thereto and having a fulcrum pivot, and a plurality of load pivots between said fulcrum pivots and the connection to said load-offsetting mechanism, said load pivots being spaced longitudinally of said lever.

5. In a weighing scale, in combination, load-offsetting mechanism, a lever connected thereto and having a fulcrum pivot, and a plurality of load pivots between said fulcrum pivots and the connection to said load-offsetting mechanism, said load pivots being spaced longitudinally of said lever and lying in a common plane.

6. In a scale, in combination, a frame, a lever fulcrumed thereon, a plurality of load pivots located on the same side of the fulcrum of said lever, a plurality of commodity-receivers supported by said load pivots, stems rigid with said commodity-receivers, and a link pivoted to said frame and to said stems.

7. In a scale, in combination, a frame, a lever fulcrumed thereon, a plurality of load pivots located on the same side of the fulcrum of said lever, a plurality of commodity-receivers supported by said load pivots, parallel stems rigid with said commodity-receivers, and a link pivoted to said frame and to said stems.

8. In a scale, in combination, a lever, load-offsetting mechanism connected thereto, an indicator, and a plurality of commodity-receivers mounted on said lever between its fulcrum and connection with the load-offsetting mechanism and so related to said load-offsetting mechanism that the extent of movement of the indicator for the same load varies according to the commodity-receiver carrying the load.

9. In a scale, in combination, a lever, load-offsetting mechanism connected thereto, an indicator, and a plurality of commodity-receivers arranged side by side on said lever between its fulcrum and connection with the load-offsetting mechanism and so related to the load-offsetting mechanism that movement of the indicator caused by a load on one commodity-receiver is a multiple of the movement caused by an equal load on another commodity-receiver.

HALVOR O. HEM.

Witnesses:
C. O. MARSHALL,
M. C. OHL.